No. 762,521. PATENTED JUNE 14, 1904.
D. E. FELT.
REGISTERING MECHANISM FOR CALCULATING MACHINES.
APPLICATION FILED DEC. 10, 1903.
NO MODEL. 4 SHEETS—SHEET 1.

Witnesses:
Wm Geiger

Inventor:
Dorr E. Felt
By Munday, Evarts & Adcock
Attorneys

No. 762,521. PATENTED JUNE 14, 1904.
D. E. FELT.
REGISTERING MECHANISM FOR CALCULATING MACHINES.
APPLICATION FILED DEC. 10, 1903.
NO MODEL. 4 SHEETS—SHEET 2.
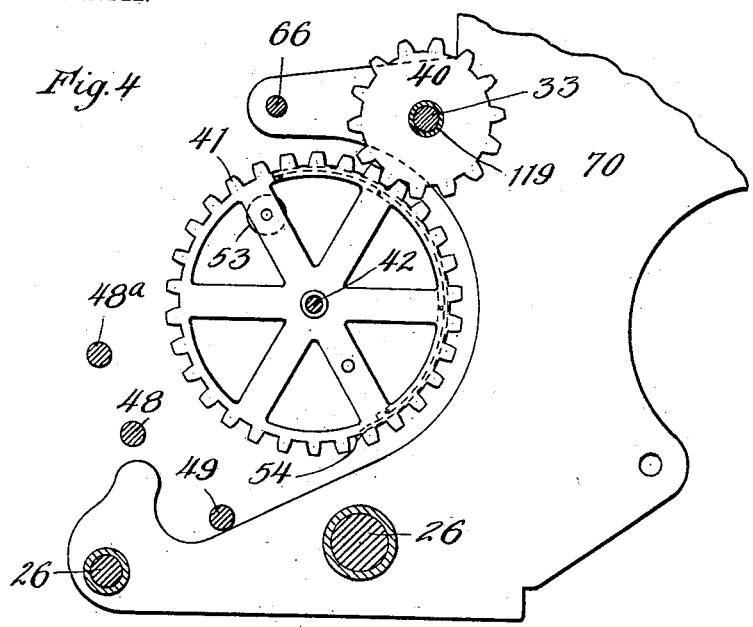
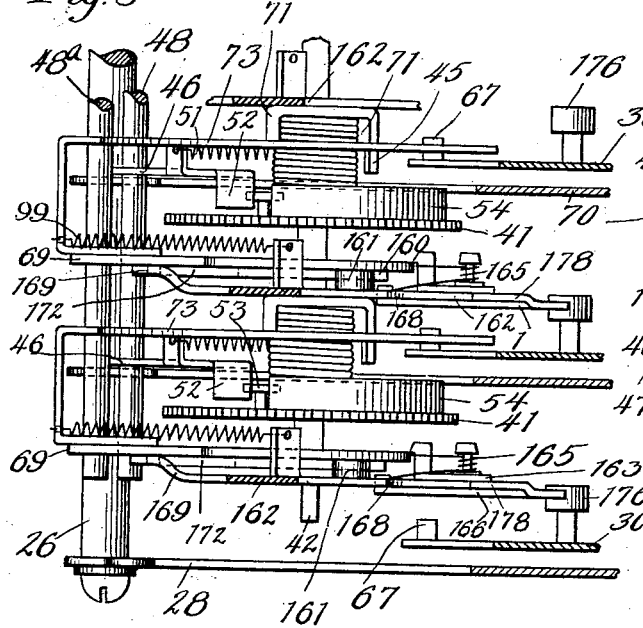
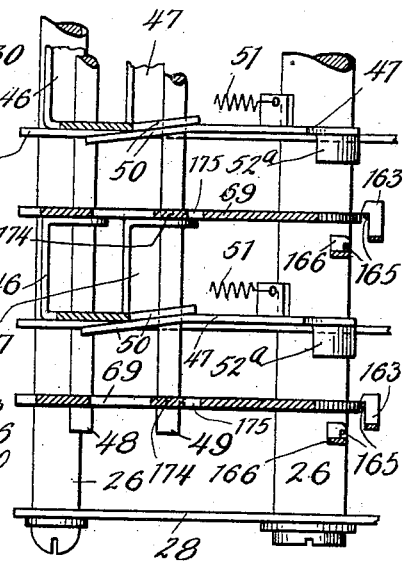
Witnesses:
Wm. Geiger
Inventor:
Dorr E. Felt
By Munday, Evarts & Adcock,
Attorneys No. 762,521. PATENTED JUNE 14, 1904.
D. E. FELT.
REGISTERING MECHANISM FOR CALCULATING MACHINES.
APPLICATION FILED DEC. 10, 1903.
NO MODEL. 4 SHEETS—SHEET 3.

Witnesses:
Wm. Geiger
S. W. Munday

Inventor:
Dorr E. Felt
By Munday, Evarts & Adcock,
Attorneys.

No. 762,521. PATENTED JUNE 14, 1904.
D. E. FELT.
REGISTERING MECHANISM FOR CALCULATING MACHINES.
APPLICATION FILED DEC. 10, 1903.
NO MODEL. 4 SHEETS—SHEET 4.
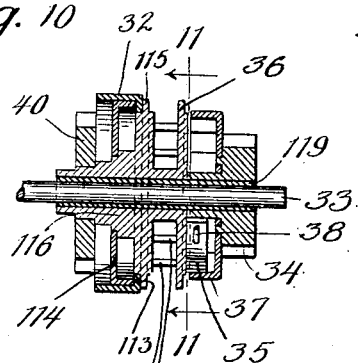
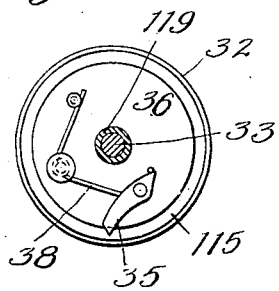
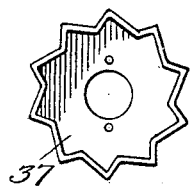
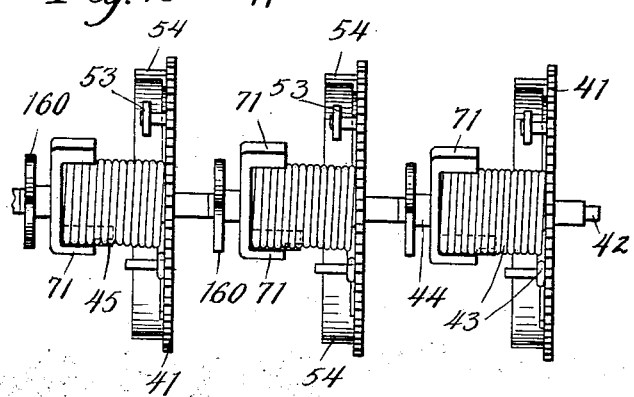
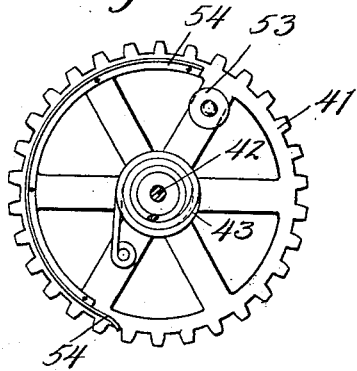
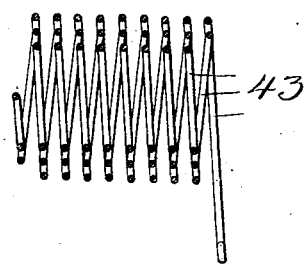
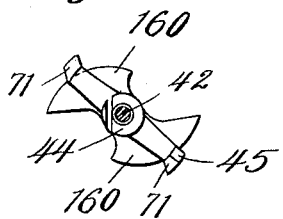
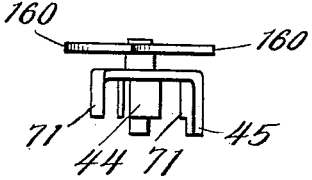
Witnesses:
Wm. Geiger
H. W. Munday
Inventor
Dorr E. Felt
By Munday, Evarts & Adcock
Attorneys No. 762,521.

Patented June 14, 1904.

UNITED STATES PATENT OFFICE.

DORR E. FELT, OF CHICAGO, ILLINOIS.

REGISTERING MECHANISM FOR CALCULATING-MACHINES.

SPECIFICATION forming part of Letters Patent No. 762,521, dated June 14, 1904.

Original application filed June 29, 1903, Serial No. 163,488. Divided and this application filed December 10, 1903. Serial No. 184,563. (No model.)

*To all whom it may concern:*

Be it known that I, DORR E. FELT, a citizen of the United States, residing in Chicago, in the county of Cook and State of Illinois, have invented a new and useful Improvement in Registering Mechanism for Calculating-Machines, of which the following is a specification.

The object of the present invention is to provide calculating-machines with an improved construction of registering mechanism and is a division of my application upon calculating-machines, Serial No. 163,488, filed June 29, 1903.

The nature of the improvement, as well as the details thereof, is fully set forth in the following description thereof and also illustrated in the accompanying drawings, in which—

Figure 1:
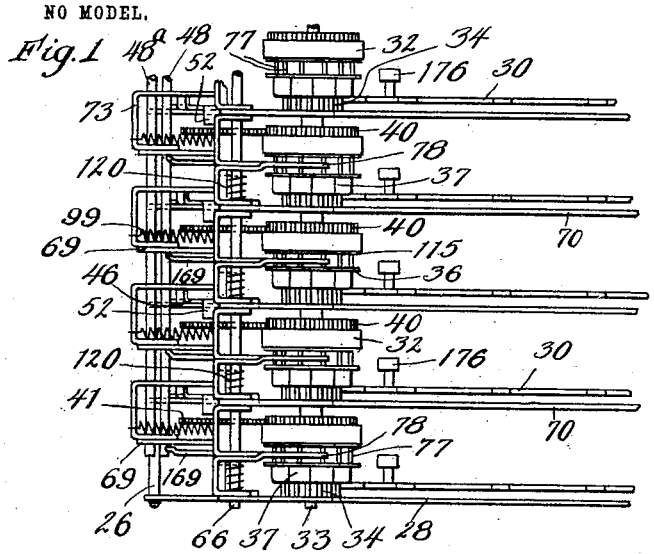
Figure 2:
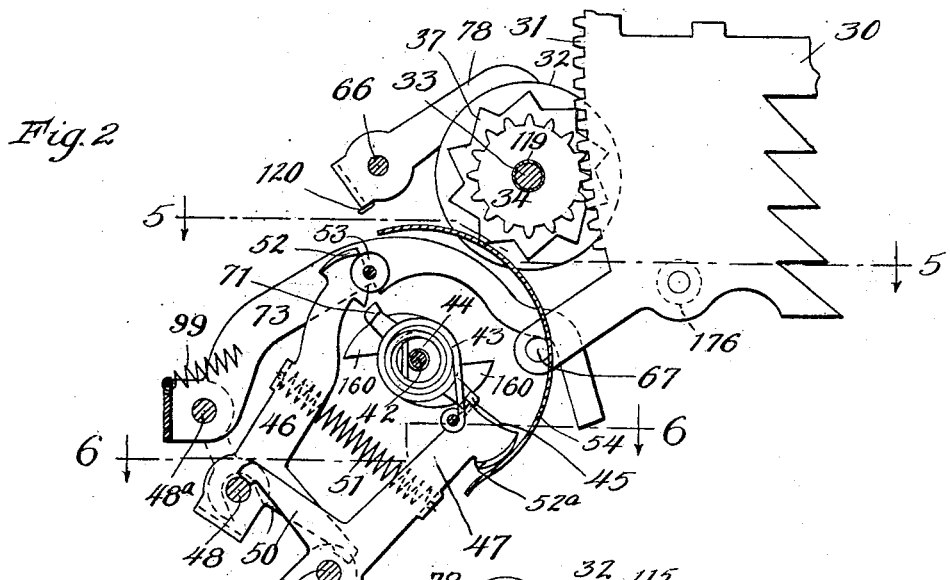
Figure 3:
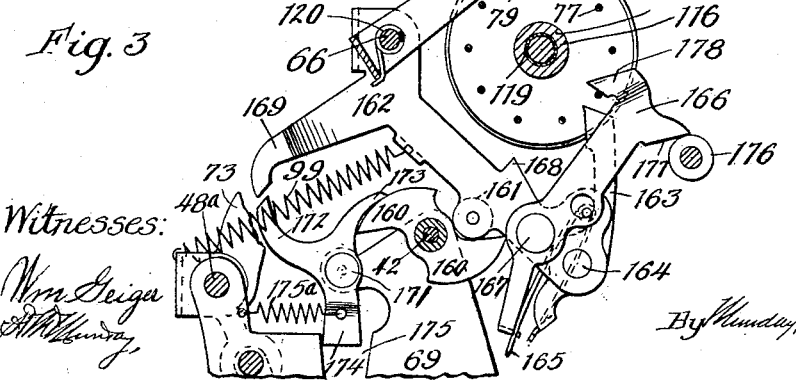
Figure 7:
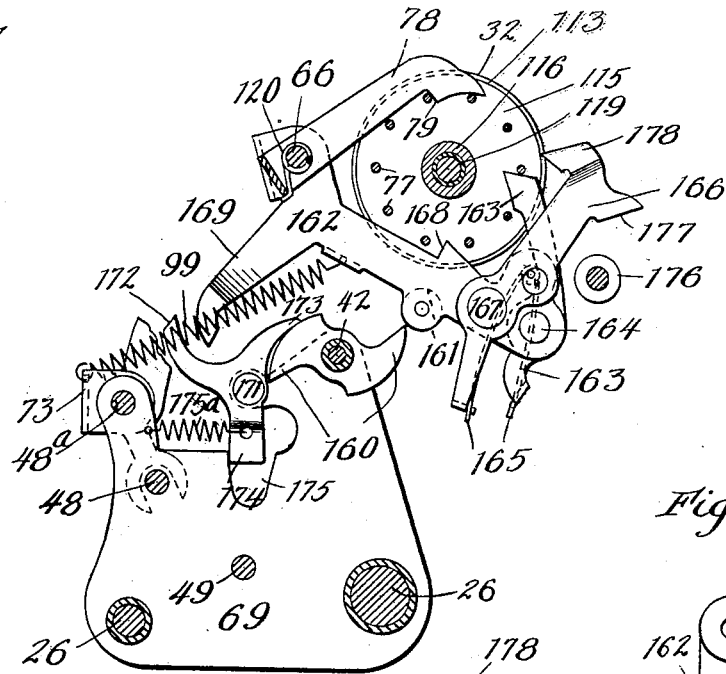
Figure 9:
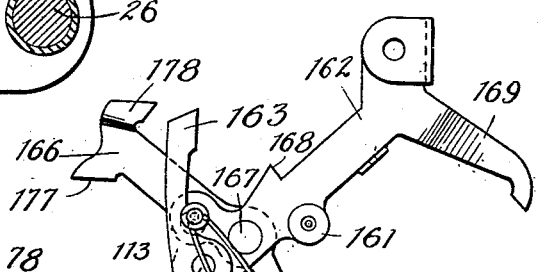
Figure 8:
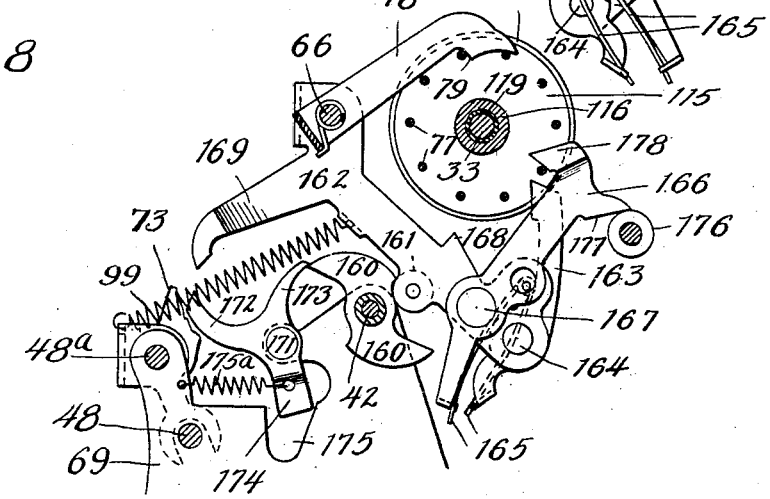

Figure 1 is a plan view of the registering mechanism. Figs. 2, 3, and 4 are vertical sections in adjacent planes. Figs. 5 and 6 are sections on the lines 5 5 and 6 6, respectively, of Fig. 2. Figs. 7 and 8 are views similar to Fig. 3, showing the parts in different positions. Fig. 9 is an elevation of the opposite sides of some of the parts shown in Figs. 7 and 8. Fig. 10 is a section of one of the numeral-wheels and its accompanying parts. Fig. 11 is a section on the line 11 11 of Fig. 10. Fig. 12 is a face view of the internal ratchet of the numeral-wheel. Fig. 13 is an elevation of the carrying-gears and their shaft and springs. Fig. 14 is a side elevation of one of said gears. Fig. 15 is a section of the carrying-spring. Fig. 16 is a partial section, and Fig. 17 a plan of the parts shown in Fig. 16.

In the drawings, 28 represents the frame of the machine united by cross-bolts 26 wherever necessary, and 69 represents vertical plates in the denominational spaces and supporting some of the moving parts, and 70 represents divisional plates arranged between the different denominational spaces.

The column-actuators consist of the levers 30, carrying toothed segments 31, from which the numeral or register wheels are actuated, and correspond to what I have generally designated by the term "segment-levers" in my previous patents. The numeral-wheels are shown at 32 and all are mounted loosely on the shaft 33, with which wheel is a pinion 34, also on shaft 33 and meshing with the corresponding toothed segment 31, and such pinion has a pawl-and-ratchet connection with its numeral-wheel. The pawl 35 of this connection is carried on the disk 36, which is rigid with the wheel, and the ratchet is an internal one and shown at 37 and is rigid with the pinion. The pawl is pressed constantly by the spring 38. The column-actuator turns the pinion when it descends and when it rises; but the pawl and ratchet prevent any turning of the numeral-wheel, except during the rising movement of the actuator.

Adjacent to each numeral-wheel and fast on the same is a pinion 40, through which the carrying mechanism is operated. These pinions mesh with carrying-gears 41 on the shaft 42, arranged parallel with the numeral-wheel shaft, and actuate said gears to an extent corresponding to the movement received by the numeral-wheels from the keys and from the carrying mechanisms. The gears 41 have preferably twice as many teeth as the pinions 40, and each is provided with a spring 43, one end of which is attached to the gear and the other end of which is attached to the sleeve 44, encircling shaft 42 and carrying a right-angle arm 45. The sleeve is permitted to rotate intermittently, as hereinafter stated, and the spring is wound up by the rotation of the gear 41, so as to store up the power necessary for operating the sleeve, the tension upon the spring being retained between the intermittent movements of the sleeve by the contact with arm 45 of the alternately-engaging detents 46 and 47, which are normally in the path of the arm. Although they are differently formed, the detents are both adapted to arrest the arm, and they are independently mounted upon separate shafts 48 and 49, and each has a foot or right-angled extension 50 bearing on the shaft of the other and limiting its movement in one direction. A spring 51 unites the free ends of the two detents, so that they are both adapted to yield to the slight extent necessary to release the arm 45. Aside from this they have no movement.

Each of the detents 46 and 47 carries a laterally-projecting ear, that upon detent 46 being indicated by 52 and that upon detent 47 by 52ª, and such ears are normally in the path of a dolly-roll 53 on the side of the carrying-gear 41. When the roll encounters either of said ears, it lifts or moves the detent to which the ear is secured out of the way of the arm 45, and thus allows the sleeve to turn a half-revolution under the power of the spring 43, the sleeve being arrested by the engagement of the arm 45 with the opposite detent. These operations of the sleeve are coincident in point of time with the arrival of the corresponding numeral-wheel at the zero position. The carrying-gear is provided with a curved guard 54 on the same side with roll 53 and located far enough out from the axis to enable it to pass outside the ears 52 of the detents, and it extends about half-way around the gear, so that when one of the detents is being operated or displaced by the roll the other is confined by the guard and does not lose its position when it is struck by the arm 45. This guard also acts to prevent any possibility of the arm 45 avoiding arrest by the confined detent by insuring the proper position of the latter, and this is the main purpose of the guard, and it thereby positively limits the operations of the sleeve to half-rotations. The sleeve 44 also carries two oppositely-projecting cam-arms 160 160. (Best shown in Figs. 2, 3, 7, 8, and 16.) Normally when either detent 46 or 47 is in engagement with the arm 45 of the sleeve, as shown in Fig. 2, the cams stand in the position shown in said figure and also in Fig. 3. In this position a dolly-roll 161, attached to the swinging lever 162, pivoted on a cross-rod 66, rests against the hub of the cam-arms and in proximity to the concave side of one of these arms. The lever 162 carries on its extreme end the carrying-pawl 163, pivoted at 164 and provided with a spring 165, acting to press the upper end of the pawl into engagement with the wires 77, secured in the side of the numeral-wheel. Said lever also carries at its outer end detent 166, pivoted at 167 and acting to prevent overthrow when the wheels are actuated by the keys. This detent is also acted on by the spring 165, one limb of which is engaged by pawl 163 and the other by detent 166. The spring tends to keep the detent out of engagement, but is normally overcome, as will be understood later on. Lever 162 is provided on its upper edge with a stop projection 168, adapted to enter between the wires 77 at the completion of each carrying operation. At the other side of its pivot the lever 162 carries an arm 169, the function of which is explained below. A spring 99 acts on lever 162, its other end being secured to the base end of a latch 73, fully described below, and draws the long end of the lever downward, as will be understood from Fig. 16.

At 171 in the plate 69 is located the pivot of a three-armed detent 172, 173, and 174. The arm 172 of this detent contacts with the arm 169 of lever 162. The arm 173 contacts with and is operated by the cam-arms 160, and the arm 174 extends into a slot 175, formed in the supporting-plate, and thereby limits the movement of the other two arms. A spring 175ª returns this detent to normal position. Each column-actuator carries a dolly-roll 176 in such position that the roll will contact with the inclined under edge 177 of the detent 166, when the actuator returns to its normal position after being operated by the keys, the effect of such contact being to overcome the spring 165 and press the hook 178 of the detent between the wires 77.

The spring 43 is of peculiar construction and, as shown, consists of three series of concentric and integral coils one outside of another. In the manufacture of this spring the inner series of coils are first formed, then a second series are formed, the wire being laid in the reverse direction from the direction of the first series, and the largest or outer series are then formed, the wire being again reversed and directed in the same way as in the coiling of the first series. This spring exerts practically the same amount of power at the end that it has at the beginning of its operation and may be made of the round wire generally known as "piano-wire" and is equally efficient with the flat metal spring heretofore used, without having the marked tendency to break to which the latter is peculiarly subject. When the spring 43 is permitted to act by the release of either of the detents 46 47 and the sleeve 44 is given a half-turn turn, the arm 45 moves into engagement with the other detent, and the cam-arms reverse their positions. In this movement one of the arms 160 throws the three-armed detent, so that arm 172, which normally holds lever 162 against movement, passes out from under arm 169 and leaves lever 162 free to swing, when the dolly-roll 161 rides up and over the same cam-arm, which displaces the detent 172. In the initial part of the rotation of the sleeve said dolly-roll rides upon a concentric part of the hub of the cam-arms, and consequently no movement is imparted to lever 162 until the roll reaches the base of the cam. The cam now lifts the long arm of the lever, and in so doing the carrying-pawl imparts the carrying movement to the numeral-wheel. The detent does not interfere with this operation of the numeral-wheel, because it moves in unison with the carrying-pawl. While the movement is progressing, however, the detent is freed in a measure from the control of dolly-roll 176 and allows the spring 165 to gradually force the detent out of its engagement with pins 77, so that when the lever 162 drops back the hook 178 will pass into position opposite the next space between the pins 77 and be forced into said space by the dolly-roll 176. The return of lever 162 occurs as soon as dolly-roll 161 passes off the cam-arm and enters the concave side thereof, the long arm of lever 162 being then drawn down by spring 99, carrying the pawl and detent with it, and this results in the lever being again locked by arm 172 and the detent entering the next succeeding space between the wires 77 of the numeral-wheel and again locking the wheel, as above described, the downward movement of the detent causing this action by it by reason of the contact of incline 177 with dolly-roll 176. It will thus be noted that the detent normally locks the numeral-wheel and releases it only when the column-actuator is depressed by the key and momentarily during the carrying operations, and in this respect my invention differs from machines previously made, in which the wheels are usually unlocked at 8 and 9. It will be understood that the locking projection 168 acts in conjunction with detent 178 in locking the numeral-wheel after the carrying operations and insures prevention of over-rotation in carrying. It locks only when the lever 162 is lifted, as already described, and releases by the return of that lever. In order to prevent the loss or swallowing of the carrying movements in the other and generally larger movements of the numeral-wheels received from the impulses of the keys, which would occur if the carrying took place simultaneously with the key movements, I have devised means whereby the operation of the carrying mechanism of the different denominations is caused to take place between the key-strokes in the same denominations and after such strokes have been completed and the numeral-wheels have moved in accordance therewith. This feature of the invention will now be set forth.

The sleeve 44 is also provided at opposite sides, as shown at Fig. 16, with two projections 71, each adapted to engage the under edge of a latch 73, pivoted on the cross-rod 48ª. The latch is extended over and rests on the column-actuator of the denomination to which the carrying is to be done, and preferably on the pin 67 on the actuator, and a spring 99, already mentioned, draws the latch over onto the actuator. Normally the latch is out of engagement with the projections 71; but when any key of the column to which the carrying is done is struck the actuator of that column moves down, so that the latch drops into position where it must engage the first or nearest one of the projections 71 as soon as the sleeve begins to turn. The sleeve is thus arrested before it gets fairly started or has performed any function and continues to be held by the latch until the column-actuator of the wheel to be carried has fully completed its upstroke after being depressed by a key. When the actuator thus returns to its normal position and as it arrives at the same, it lifts the latch through the contact of the pin 67 with the end of the latch, so that the engagement with the sleeve is terminated, leaving the sleeve free to turn under the power of the carrying-spring 43 and through the mechanism already described to operate its numeral-wheel through a one-tenth revolution.

A further peculiarity of the carrying mechanism should here be referred to. Suppose the numeral-wheels of adjacent denominations are standing so as to indicate twenty-nine, in which case of course the power necessary for a single carrying from the lower wheel to the next higher one will have been stored up in the carrying-spring of the former. If now thirty-nine more is added to the twenty-nine already on the wheels by touching two keys simultaneously, the carrying-spring (or other motor of the carrying mechanism) before it has let off any of the power previously stored in it will be compelled to receive and store in addition enough or nearly enough power for a second carrying, because it will be remembered that the first carrying does not take place under the law of the machine until after the keys depressed in adding the thirty-nine have fully completed their strokes, so that it will be seen that the carrying-motor, whether it consists of a spring or some other form of motor, must necessarily be capable of storing up power nearly sufficient for two carrying operations, and not only must the motor be thus capable of storing up power for a plurality of carrying operations, but it must also be capable of retaining the power for the second carrying when it gives up the power required in the first one, or, in other words, the motor must not be of a kind which will part with all its power at once, but must retain the excess power possessed by it at the time of any carrying operation and hold such excess in reserve for the next operation. Because of its adaptability to the location and its ability to receive and store up power for two successive operations and its ability to retain the excess power I prefer to employ the spiral spring shown at Fig. 15, already described, or some similar construction, as the carrying-motor; but of course I do not wish to be limited thereto.

Another important feature of the machine may be here noticed. All operations of the numeral-wheel, whether caused by actuations received direct from the keys or from the carrying mechanism, take place against the restraining power of a constantly-acting spring—in this instance the spring 43—and each operation of the wheel winds up that spring, and thereby enables it to operate the carrying mechanism. In other words, the wheel is always under restraint by a spring whose tension is practically uniform and constant, and consequently the tendency to overrotate is very greatly lessened. The spring further acts to soften the blow of the wires 77 on the detent-hook 178 and generally to soften the arrest of the actuators and free the machine of much of the shock and jar which have heretofore attended its use and render its operation comparatively smooth, easy, and free from noise.

Mounted on the cross-rod 66 is a detent 78, adapted to ride on the wires 77 when the numeral-wheels move forward, but having a shoulder 79 adapted to engage the wires in case of any backward rotation. This device is clearly shown at Fig. 8.

The numeral-wheels are of peculiar construction. Their horizontal faces are formed of celluloid or other light material and are provided with internal flanges 113, which are gripped between the rims 115, mounted on the wheel-hubs 116, and disks 114, also mounted on the hubs and having right-angle flanges pressing the flanges 113 against the rims 115. The arms 115 and also the disks 36 are preferably made in one piece with the hubs 116. Each wheel is preferably mounted upon a separate bushing or sleeve 119 within its bore and around the supporting-shaft 33 and also extending into the actuating-pinion 34. This sleeve is loose upon the shaft, and both the wheel and pinion are loose upon the sleeve and may turn together thereon or independently. By these features of construction the wheel is rendered very light and the friction is reduced.

The internal ratchet 37 and its outwardly-pressed pawl 35 are much to be preferred to the exterior ratchet and inwardly-pressed pawl which they replace. In the case of the latter a heavy spring is required to insure action by the pawl, especially on the first tooth, and causes considerable friction and renders the key touch hard. In the new construction a comparatively light spring is used without endangering the engagement of the pawl with the first tooth of the ratchet, and this result is due to the fact that the light spring is reinforced by the outwardly-acting centrifugal force. The light spring relieves much of the friction present with the old construction.

The detents 78 are employed to prevent backward rotation of the numeral-wheels, and they engage the pins 77. They are pressed down on the pins by their springs 120.

I claim—

1. The calculator embodying a series of numeral-wheels and a series of carrying mechanisms acting on said wheels, each carrying mechanism having its own motor-spring put under tension by the wheel of next lower order, and the means whereby the wheels put the springs under tension, being adapted to store power in excess of the amount required in single carrying operations.

2. The calculator embodying a series of numeral-wheels and a series of carrying mechanisms acting on said wheels and located outside the same, each carrying mechanism having its own motor-spring put under tension by the wheel of next lower order, and the means whereby the wheels put the springs under tension, being adapted to store power in them in excess of the amount required in single carrying operations.

3. The calculator embodying a series of numeral-wheels and a series of carrying mechanisms acting on said wheels, each carrying mechanism having its own motor-spring put under tension by the wheel of next lower order, and the means whereby the wheels put the springs under tension, being adapted to store power in them in excess of the amount required in single carrying operations, and the motor-springs being controlled so that when they carry they expend only the force necessary therefor and retain the excess which may have been stored in them.

4. The calculator provided with a numeral-wheel consisting of a celluloid rim and metal disks clamping the inwardly-extending flange of the rim.

5. In a calculator, a carrying mechanism provided with a spring 43, consisting of a plurality of integral concentric coils.

6. The spring for use in calculating-machines, consisting of a plurality of serial coils, one inside of another and integral with each other.

7. The combination in a calculating-machine, of a series of numeral-wheels representing different denominations and carrying from one to another, of a series of carrying-springs, one for each wheel connected to the wheels and winding up by their forward rotation, and acting to constantly restrain such rotation.

8. The combination with the numeral-wheels, of gears driven by the wheels, springs wound up by said gears and serving to restrain the wheels from overrotation, and carrying mechanism actuated by the same springs.

9. The combination with the numeral-wheels, of gears driven by the wheels, springs 43 having concentrated coils constructed essentially as described and put under tension by the wheels, and carrying mechanism actuated by the same springs.

10. The combination with the cams 160 and the carrying-lever actuated thereby, of the corresponding numeral-wheel and the spring for actuating the cams interposed between the wheel and the cams.

11. The combination of a carrying device, with a cam for actuating the device, a numeral-wheel of the same denomination with the carrying device, and a spring wound up by the wheel and actuating the cam.

12. In a multiple-order calculating-machine, adjacent primary numeral-wheels, a carrying mechanism for carrying from the lower to the upper of such wheels, such mechanism embracing a motor-spring and means for winding said spring adapted to store power therein in excess of the amount required for a single carrying operation, and means for preventing the operation of the carrying mechanism until after power in excess of that required for a single carrying has been stored.

13. The carrying mechanism provided with a coiled motor-spring adapted to permit the storing of power nearly sufficient for two carrying operations, means for winding up such spring until it is thus charged and means for preventing it from operating the mechanism until after the power for the first carrying has been stored.

14. The combination with a numeral-wheel of a carrying mechanism having a coiled motor-spring adapted to be wound in excess of the winding necessary for a single operation and a winding device for the spring actuated by the numeral-wheel.

15. The combination with a numeral-wheel of a carrying mechanism having a coiled motor-spring adapted to be wound in excess of the winding necessary for a single operation, a winding device for the spring actuated by the wheel, and means for delaying the carrying operation until after the numeral-wheel has received its full actuation from its other actuating devices.

16. In a multiple-order calculating-machine, a series of primary numeral-wheels and a series of carrying mechanisms therefor, such mechanisms being each provided with a motor-spring having a large number of turns so that its tension varies slightly before and after operating the mechanism.

17. The numeral-wheels, the actuating-pinions for the wheels and the numeral-wheel shaft in combination with a series of sleeves, a separate one for each wheel and its pinion, said sleeves being loose upon the shaft, and the wheels and pinions being loose upon the sleeves and capable of turning together or independently thereon.

18. The numeral-wheel having a celluloid face or horizontal rim in combination with metal disks for holding the rim.

19. The numeral-wheel having a light face or horizontal rim of celluloid, in combination with a metal hub and outstanding parts for supporting such rim.

20. The numeral-wheel having a light rim or horizontal face of celluloid provided with an inward flange in combination with a metal hub, a rim integral with the hub at one side of said flange and a disk mounted on the hub at the other side of said flange.

21. The combination in a carrying mechanism of a motor-spring, means for storing varying amounts of power in the spring in excess of the amount needed for a single carrying, and means for preventing the spring from operating while such excess power is being stored.

22. The combination in a carrying mechanism, of a motor-spring, means for storing varying amounts of power in the spring in excess of the amount needed for a single carrying, means for holding the mechanism from operation during and after the storing of the power for the single carrying and means for reserving such excess power when the carrying is done.

23. The combination in a calculating-machine, of two adjacent numeral-wheels, actuating devices for such wheels adapted to be operated simultaneously and a carrying mechanism actuated by the lower wheel and carrying the upper wheel, such carrying mechanism embracing a motor-spring, means for storing power in the spring between successive carryings in varying amounts in excess of the amount needed for a single carrying and means for limiting the expenditure of the spring's force when operating to the amount needed for a single carrying.

24. The combination, in a calculating-machine, of two adjacent numeral-wheels, actuating devices for such wheels adapted to be operated simultaneously, and a carrying mechanism actuated by the lower wheel and carrying the upper wheel, such carrying mechanism embracing a motor-spring, means for storing power in the spring between successive carryings in varying amounts in excess of the amount needed for a single carrying, and means for preventing the operation of the carrying mechanism until after the time for its normal operation has passed.

25. The combination, in a calculating-machine, of two adjacent numeral-wheels, actuating devices for such wheels adapted to be operated simultaneously, and a carrying mechanism actuated by the lower wheel and carrying the upper wheel, such carrying mechanism embracing a motor-spring, means for storing power in the spring between successive carryings in varying amounts in excess of the amount needed for a single carrying, means for preventing the operation of the carrying mechanism until after the time of its normal operation has passed, and means for preventing the expenditure of the excess power when the carrying takes place.

26. The carrying-gear 41 having a guard 54 in combination with the alternately-acting detents 46 and 47.

DORR E. FELT.

Witnesses:
H. M. MUNDAY,
EDW. S. EVARTS.